3,563,908
VISCOSITY-STABILIZED FOAM PRECURSORS AND PROCESS
Fred W. Koenig, Highland, and Stanley T. Kus, Griffith, Ind., and Sheldon Howard Marcus, Skokie, Ill., assignors to Standard Oil Company, Chicago, Ill.
No Drawing. Continuation-in-part of application Ser. No. 420,801, Dec. 23, 1964. This application Dec. 22, 1967, Ser. No. 692,719
Int. Cl. C08g 22/44; C09k 3/00
U.S. Cl. 252—182                    5 Claims

ABSTRACT OF THE DISCLOSURE

Stabilized liquid non-polymeric foam precursors are produced when fluorine substituted alkanes boiling above 60° F. are added to a liquid non-polymeric foam precursor prepared by mixing a polyfunctional aromatic carboxylic acid derivative with a liquid polyarylpolyisocyanate. These foam precursors are reacted with a polyol having a molecular weight below 2,000 and containing at least three hydroxyl groups. The resulting foams produced are useful for insulation of walls, for fireproofing buildings and the like.

---

This application is a continuation-in-part of Ser. No. 420,801, filed Dec. 23, 1964, now abandoned, by the same inventors, Fred W. Koenig, Stanley T. Kus and Sheldon H. Marcus.

This invention relates to improved stable foam precursor compositions and to a process for stabilizing these compositions. In a particular aspect it relates to the stabilization of polyfunctional aromatic acid and polyarylpolyisocyanate compositions with fluorine containing lower alkanes. These stabilized compositions are then reacted with a polyol containing at least three reactive hydroxyl groups to produce thermally stable foam. The foams are useful in insulation of walls, for fireproofing buildings and the like. The resulting foams have great commercial value because they can be easily processed; for example, they do not have to be prefabricated but can be prepared and foamed at the place and in the position where they are to be used.

In the prior art fluorine containing lower alkanes were used as blowing agents for preparing polyurethane foam. In the prior art fluorine containing lower alkanes have not been used to stabilize liquid nonpolymeric foam precursors consisting of polyarylpolyisocyanate and polyfunctional aromatic acids, anhydrides and acyl halides. The fluorocarbon effectively prevents the solidification of the liquid non-polymeric foam precursors by inhibiting the reaction between the anhydride and carboxyl or acyl halide groups with the isocyanato groups.

The foam precursors formed by solubilizing polyfunctional aromatic acids, acid anhydrides or acyl halides in polyarylpolyisocyanate as disclosed in Ser. No. 420,774, filed Dec. 23, 1964, and now abandoned, are not very stable over long periods of time. The instability is manifested by an increase in the viscosity of the foam precursor composition to a point where the mixture cannot be pumped and where commercial foam equipment cannot be used. This is apparently a consequence of the tendency of the foam precursor to undergo further reaction with the resulting increase in viscosity, which tends to limit the commercial utility.

It has been discovered that when a fluorocarbon is added to a mixture of polyfunctional aromatic acid, aromatic anhydride, acyl halide, or a combination of these are mixed with a polyarylpolyisocyanate, the resulting composition is stabilized for many months.

THE STABILIZATION SYSTEM

The components of the stabilized system are fluorocarbon, polyarylpolyisocyanates and polyfunctional aromatic acids, acid anhydrides, acyl halides or mixtures of these. The polyfunctional aromatic acid derivatives useful in making the flame-resistant foam have a polyfunctional aromatic nucleus substituted by the same or different members selected from the group comprising carboxyl, acid anhydride or acyl halide. Non-reactive substituents may be present on the aromatic nucleus; for example, alkyl groups containing one to four carbon atoms, nitro groups and halide groups. Illustrative polyfunctional aromatic carboxylic acid derivatives useful in our process are trimellitic acid anhydride, trimellitic acid, double anhydride of trimellitic acid, trimellitic acid halide, pyromellitic dianhydride, pyromellitic acid, terephthalic acid, phenylindane dicarboxylic acid, phthalic acid, phthalic anhydride, isophthalic acid, trimesic acid, 3,4,3′,4′-tetracarboxybenzophenone, 3,4,3′ - tricarboxybenzophenone, 4,4′-carboxybenzophenone, the acyl halides of these carboxybenzophenones, the dianhydride of 3,4,3′,3′-tetracarboxybenzophenones the monoanhydride of 3,4,3′,4′-tetracarboxybenzophenone 1,3,3-trimethyl-1-phenylindane-4′,6′-dicarboxylic acid, and mixtures of these various carboxylic acid derivatives. The 4-trimellitate bis anhydride formed when trimellitic anhydride is reacted with a polyol as disclosed in U.S. Pat. No. 3,183,248, by Arthur G. Hirsch et al. is also useful. These compounds have two trimellitic acid anhydride groups joined through the carboxylic acid positions by ester linkages. These ester linkages can be joined by an alkylene group. Compounds joined by an ethylene or propylene group are representative of this type of a compound. In case the ester linkages are joined by propylenes the middle carbon can have an organic acid or ester attached to it without losing effectiveness in our process.

To a degree the unique flame-resistance of the foam prepared from the liquid non-polymeric foam precursors can be attributed to these aromatic compounds in the foam precursor.

The foam is not flame-resistant when the polyfunctional aromatic acid derivatives are left out from the foam precursor. Also when liquid non-polymeric foam precursors are prepared using aliphatic anhydrides or acids, the resulting foams have a very high burning weight loss, and in many instances support a flame. Therefore, it is imperative that aromatic compounds be used. The best results are obtained with compounds having an anhydride group and also a carboxyl group or an acyl halide group. The preferred polyfunctional aromatic acid derivatives are substituted benzenes where one substituent is an anhydride and the other is a carboxylic acid, acyl halide or an anhydride; trimellitic anhydride, the acid chloride of trimellitic anhydride, pyromellitic dianhydride and phthalic anhydride are good examples. Excellent results are, however, obtained with other aromatic acids. For example, when trimesic acid, terephthalic acid, phenylindane dicarboxylic acid are mixed with polyarylpolyisocyanate to form the non-polymeric liquid foam precursor which is then reacted with a polyol having at least three reactive hydroxyl groups and a molecular weight below 2,000 give foams which have very low burning weight losses and have excellent thermal resistance. Good flame-resistant foams are also obtained when a liquid non-polymeric foam precursor is prepared from a mixture of the acid, or anhydrides, is used. In many cases the foam precursor prepared from these mixtures shows a lower burning weight loss than when only pure aromatic acids or anhydrides are utilized.

The polyarylpolyisocyanates useful in this process contain at least two aromatic rings with one isocyanato group in each aromatic ring. These aromatic rings are suitable interconnected by ether, sulfone, sulfoxide, methylene, propylene or a carbonyl linkage or by two methyl groups connected to a benzene ring substituted by an isocyanato group. The polyarylpolyisocyanates which are isocyanate-substituted biphenyls are also useful in this process. In all of these cases the aromatic rings of the polyarylpolyisocyanates can be substituted by methyl, ethyl or propylene groups. Specific examples of suitable polyarylpolyisocyanates for use in the invention include: polymethylene polyphenylisocyanate having from two to ten benzene rings each substituted by one isocyanato group and liquid mixtures at room temperatures of polymethylene polyphenylisocyanates and one or more of the following polyarylpolyisocyanates: 4,4'-diphenylmethylene diisocyanate; 3,3'-diphenylmethylene diisocyanate; diphenyl diisocyanate; diphenylsulfone diisocyanate; diphenyl sulfide diisocyanate; diphenylsulfoxide diisocyanate; and diphenylpropane diisocyanate. Polymethylene polyphenylisocyanates having an average benzene ring content of about 2.1 to 3.5 per molecule are particularly suitable polyarylpolyisocyanates.

Any polyarylpolyisocyanate or mixture of those disclosed above which is liquid at room temperature or in the temperature up to 100° F. is an effective polyarylpolyisocyanate for the preparation of liquid non-polymeric foam precursors. The solubilization of the aromatic acid derivatives will proceed at room temperature if the polyarylpolyisocyanates are liquid at that temperature but higher melting polyarylpolyisocyanates can be used when slight heating is applied, usually not to exceed 100° F. The preferred polyarylpolyisocyanates or mixtures of these are liquid at room temperature.

It has been observed that the viscosity of the aromatic acids or aromatic acid derivatives and polyarylpolyisocyanate composition increased upon standing. This increase in viscosity is highly undesirable when carboxylic acid derivative and the polyarylpolyisocyanate composition gets too viscous for commercial foam machine handling. It has been discovered that the addition of fluorocarbon stabilizes the liquid non-polymeric foam precursor and thus removes an obstacle to their successful commercial utilization. It is believed that the fluorocarbons inhibit the further reaction between the isocyanato groups and the anhydride, acyl halide or carboxylic acid group of the aromatic acid derivatives. The addition of a fluorocarbon to the polyarylpolyisocyanates or to the aromatic acid, acid anhydride, acyl halide or to the foam precursor immediately after the ingredients are mixed, greatly increases the stability of the resulting liquid non-polymeric foam precursor and in fact at least doubles the commercial useful lifetime of these non-polymeric foam precursors.

Fluorocarbons useful in the stabilization system are fluorine substituted lower alkanes having a carbon chain length not in excess of six carbon atoms and boiling above 60° F. and the fluorine substituted compounds can suitably be substituted by other halogen substituents. Representative fluorocarbons useful in stabilizing foam precursors are trichlorofluoromethane; 1,1,2,2-tetrafluoro-1,2-dibromoethane; 1,1,2-trifluoro,2,2-trichloroethane; 1,1,2,2-tetrachloro-1,2-difluoroethane.

The mixing of the fluorocarbons, polyarylpolyisocyanates and polyfunctional aromatic carboxylic acid derivatives must be conducted at a temperature below the boiling point of the fluorocarbon. The mixing is conducted without any addition of external heat or pressure to the system and it is preferably conducted at room temperature.

The exact chemical mechanism for the foam precursor stabilization is not known but it has been established that it is not the diluent effect of the fluorocarbon which is responsible for the decreased viscosity. It has been determined experimentally that when fluorocarbon is added to the polyfunctional aromatic acid derivative or the polyarylpolyisocyanate or the foam precursor and then the foam precursor is kept standing for about one week, the viscosity increases slightly, up from 7.7 to 16 kilocentipoises. When the same identical mixture is kept for seven days without the fluorocarbon being added and the fluorocarbon is added immediately before taking the viscosity measurement to equalize any diluent effect, we note that the viscosity is increased to 31 kilocentipoises. The same effect was observed when in another experiment it was shown that for unstabilized mixtures the viscosity increased 156 kilocentipoises while the stabilized mixtures went only up to 12 kilocentipoises. Thus, the stabilization effect in 16 to 17 days was 144 kilocentipoises. This indicates that the reaction between the isocyanato group and the carboxylic acid, acid anhydride or acyl halide groups is blocked or inhibited by the presence of fluorocarbon while the diluent effect of the fluorocarbon is only slight.

The fluorocarbon can be added at any time either after the polyfunctional aromatic carboxylic acid derivative and the polyarylpolyisocyanate are mixed or to one of the components before it is mixed to form the foam precursor. In the preferred method the fluorocarbon is added to the polyfunctional aromatic acid derivative or polyarylpolyisocyanate which is then mixed with the other component.

The ratio of the polyarylpolyisocyanate to the carboxylic acid or its derivatives varies widely. The range is determined by the solubility characteristics of the carboxylc acid derivatives in the various polyarylpolyisocyanates and the resulting composition's amenability to machine handling.

Usually the molar ratio of the acid derivative to the polyarylpolyisocyanate varies from 1:5 to 4:5; the variation can, however, be greater (as shown in Example II hereinafter) and it is not necessary that all of the acid or its derivatives be completely dissolved in the polyarylpolyisocyanate. All of these foam precursor compositions are stabilized for several months when they contain at least about 1% by weight of the fluorocarbon. To stabilize the foam precursor for longer periods of time more fluorocarbon is added. The preferred range, however, is five to seven percent and the maximum is about twenty percent.

In a preferred process ten percent by weight of trichlorofluoromethane was added to a foam precursor composition made by solubilizing forty parts of trimellitic anhydride in one hundred parts of polymethylene polyphenylisocyanate. The viscosity of the resulting composition was 7.7 kilocentipoises. After storage for one week the viscosity was 16 kilocentipoises which is about one-half the viscosity of the unstabilized foam precursor. This viscosity is sufficient for handling by commercial foam equipment. All of the stabilized foam precursor compositions can be used in commercial foam equipment.

The stable foam precursors are usually stored at room temperature but to extend the life time of the foam precursor it is preferred, in some instances, to store the stable foam precursors at temperatures of 0° to 60° F.

The following examples are included as illustrations for the stabilization of foam precursors and for the preparation of fluorocarbon containing precursors.

Example I

Forty grams of trimellitic anhydride were solubilized in 100 g. of polymethylene polyphenylisocyanate having a molecular weight of 400, an equivalent weight of 140 and a functionality of 3. To this composition 10 g. of trichlorofluoromethane were added. The viscosity at the time of storage was 7.7 kilocentipoises as measured on a Brookfield Viscometer. This composition was stored for seven days and the stability was compared to an identical polymethylene polyphenylisocyanate-trimellitic anhydride composition to which 10 g. of trichlorofluoromethane were added just before the viscosity measurement was taken. The results of this experiment are seen in Table I which illustrates the stability of the foam precursor composition to which a fluorocarbon has been added.

TABLE I.—VISCOSITY OF 10:4:1 PARTS BY WEIGHT POLYMETHYLENE POLYPHENYLISOCYANATE:TRIMELLITIC ANHYDRIDE:TRICHLOROFLUOROMETHANE

| | Viscosity in kilocentipoises | |
| --- | --- | --- |
| | Polymethylene polyphenylisocyanate, trimellitic acid anhydride stored, trichlorofluoromethane added | Polymethylene polyphenylisocyanate, trimellitic acid anhydride stored, trichlorofluoromethane added |
| Storage time (days): | | |
| 0 | 7.7 | 7.7 |
| 1 | 20 | 12.5 |
| 2 | 17 | 12.4 |
| 3 | 20.5 | 12.75 |
| 4 | 26 | |
| 7 | 31 | 16 |

Example II

One hundred grams of trimellitic anhydride are solubilized in 89.3 grams of polymethylene polyphenylisocyanate having a molecular weight of 400, an equivalent weight of 140 and a functionality of 3. To this composition 35 grams of trichlorofluoromethane were added. A stable composition is formed which is pumpable and can be used in commercial foam equipment.

In a similar manner the other aromatic acid, acid anhydride or acyl halide and polyarylpolyisocyanate compositions disclosed above are stabilized to make them amenable to processing in commercial foam equipment.

In Example III varying amounts of trichlorofluoromethane are used to stabilize the foam precursor by adding the trichlorofluoromethane to the foam precursor after the polymethylene polyphenylisocyanate having a molecular weight of 470, an equivalent weight of 140 and a functionality of 3:3 to 3:3.

Example III

One hundred grams of polymethylene polyphenylisocyanate having a molecular weight of 400, an equivalent weight of 140 and a functionality of 3 were mixed with 55 grams of trimellitic acid anhydride. To this foam precursor were added the amounts of trichlorofluoromethane indicated in Table II. The amount of trichlorofluoromethane added to compositions prepared as described above are indicated in the following tables.

TABLE II

| Amount of trichlorofluoromethane added to foam precursor composition consisting of 100 grams polymethylene polyphenylisocyanate and 55 grams of trimellitic acid anhydride | Days aged | Centipoises | Days aged | Centipoises |
| --- | --- | --- | --- | --- |
| 1.5 | 0 | 11,200 | 76 | 224,000 |
| 2.0 | 0 | 6,800 | 76 | 72,000 |
| 2.5 | 0 | 4,800 | 76 | 20,500 |
| 3.0 | 0 | 2,800 | 76 | 9,600 |

The foregoing example illustrates the effectiveness of trichlorofluoromethane in stabilizing foam precursors. It can be seen from the column indicating aging of 0 days that the incremental dilution effect between the two concentration levels contribute 2,000–5,000 centipoises lower viscosity initially but when looking at the column indicating aging for 76 days shows a variation between the concentration levels and viscosity of between 10,000 to 150,000 centipoises.

Example IV

One hundred grams of polymethylene polyphenylisocyanate having a molecular weight of 340, an equivalent weight of 132 and a functionality of 2:5 to 2:7 were mixed with the acid derivative described in Table III.

To the foam precursor then were added 20 grams of trichlorofluoromethane.

TABLE III

| Polyfunctional aromatic acid derivative | Amount added in grams |
| --- | --- |
| Run No.: | |
| 1 Terephthalic acid | 48 |
| 2 Isophthalic acid | 48 |
| 3 Trimesic acid | 40 |
| 4 Benzophenone tetracarboxylic dianhydride | 92 |
| 5 4-acid chloride of trimellitic anhydride | 65 |
| 6 Trimesic anhydride | 55 |

A stable foam precursor was formed in each instance.

Stable foams were prepared from each one of the foam precursors prepared using the acids disclosed in runs 1 through 6 according to the following procedure:

To the total quantity of each foam precursor prepared as indicated in Example IV and Table III were mixed without the addition of external heat or pressure 50 grams of propylene oxide adduct of sucrose having a molecular weight of 1,200 and an equivalent weight of 125. To this mixture were added 2 grams of siloxane-polyglycol block copolymer silicon oil, 1 gram dibutyl tin diacetate and 20 grams of trichlorofluoromethane. Upon addition of the polyol the foam began to form. A flame-resistant non-burning foam was formed.

Example V

First, a stable foam precursor was prepared comprising: 100 parts of polymethylene polyphenylisocyanate having a molecular weight of 400, an equivalent weight of 134 and a functionality of 3, 55.0 parts of trimellitic acid anhydride and 25.0 parts of trichlorofluoromethane. The mixing was continued until all of the trimellitic anhydride had been completely dispersed. It should be noted that the order of addition is not critical to the invention.

In the above mixture the weight ratio of the polymethylene polyphenylisocyanate to trimellitic acid anhydride to trichlorofluoromethane is 10:5.5:2.5. This foam precursor was aged for 14 weeks. At the end of this period 180 parts of this foam precursor were mixed without addition of external heat or pressure with 45 parts of the propylene oxide adduct of sucrose having a molecular weight of 1,200 and an equivalent weight of 125 in the presence of 3 parts of siloxane-polyglycol block copolymer silicon oil and 2.5 parts of trichlorofluoromethane. Upon the addition of the polyol foam began to form. A flame-resistant non-burning foam was formed.

Example VI

First, a stable foam precursor was prepared comprising: 100 parts of polymethylene polyphenylisocyanate having a molecular weight of 400, an equivalent weight of 134 and a functionality of 3, 55.0 parts of trimellitic acid anhydride and 30 parts of trichlorofluoromethane. The mixing was continued until all of the trimellitic anhydride had been completely dispersed.

In the above mixture the weight ratio of the polymethylene polyphenylisocyanate to trimellitic acid anhydride to trichlorofluoromethane is 10:5.5:3.0. This foam precursor was aged for 12 months. At the end of this period 185 parts of this foam precursor were mixed without addition of external heat or pressure with 45 parts of the propylene oxide adduct of sucrose having a molecular weight of 1,200 and an equivalent weight of 125 in the presence of 3.0 parts of siloxane-polyglycol block copolymer silicon oil and 10.0 parts of trichlorofluoromethane. Upon the addition of the polyol, foam began to form. A flame-resistant non-burning foam was formed.

We claim:

1. As a composition of matter a stabilized liquid non-polymeric foam precursor prepared by mixing:

(a) a fluorine substituted halogenated alkane having a carbon chain length of 1-6 carbon atoms and boiling above 60° F.; and (b) a liquid polyarylpolyisocyanate which polyarylpolyisocyanate contains at least two interconnected aromatic rings having at least one isocyanato group per aromatic ring; and (c) an aromatic carboxylic acid derivative comprising an aromatic nucleus substituted by at least two members selected from the group consisting of carboxyl, dicarboxylic anhydride and acyl halide; wherein the molar ratio of said aromatic carboxylic acid derivative to the polyarylpolyisocyanate is 1:5 to 2.33:1 and wherein the fluorocarbon content is 1-20 percent by weight of the total foam precursor composition.

2. The composition of claim 1 wherein the polyarylpolyisocyanate is polymethylene polyphenylisocyanate.

3. The composition of claim 1 wherein the fluorine substituted halogented alkane is trichlorofluoromethane.

4. The composition of claim 1 wherein the aromatic carboxylic acid derivative is trimellitic acid anhydride.

5. The composition of claim 1 wherein said molar ratio is between about 1:5 to about 1:1.

References Cited

Rigid Urethane Foams–II Chemistry and Formulation, bulletin of E. I. du Pont de Nemours and Co., Bulletin No. HR-26, April 1958, pp. 13, 14, and front cover.

HOSEA E. TAYLOR, Primary Examiner

M. J. WELSH, Assistant Examiner

U.S. Cl. X.R.

252—399, 407; 260—2.5